(12) United States Patent
Ponikiewski

(10) Patent No.: US 10,683,028 B2
(45) Date of Patent: Jun. 16, 2020

(54) STEERING COLUMN ASSEMBLY

(71) Applicant: TRW Steering Systems Poland Sp. Z.O.O., Czechowice-Dziedzice (PL)

(72) Inventor: Pawel Ponikiewski, Pewel Mala (PL)

(73) Assignee: TRW Steering Systems Poland Sp. z o.o., Czechowice-Dziedzice (\*) Notice: Subject to any disclaimer, the term of this patent is extended or adjusted under 35 U.S.C. 154(b) by 165 days.

(21) Appl. No.: 15/747,597

(22) PCT Filed: Jul. 21, 2016

(86) PCT No.: PCT/EP2016/067471
§ 371 (c)(1),
(2) Date: Jan. 25, 2018

(87) PCT Pub. No.: WO2017/016991
PCT Pub. Date: Feb. 2, 2017

(65) Prior Publication Data
US 2018/0215408 A1 Aug. 2, 2018

(30) Foreign Application Priority Data

Jul. 27, 2015 (EP) ..................................... 15461549
Aug. 17, 2015 (GB) ..................................... 1514614.5

(51) Int. Cl.
*B62D 1/19* (2006.01)
*B62D 1/185* (2006.01)
(Continued)

(52) U.S. Cl.
CPC .............. *B62D 1/192* (2013.01); *B62D 1/185* (2013.01); *F16C 3/03* (2013.01); *B62D 1/18* (2013.01); *B62D 1/19* (2013.01)

(58) Field of Classification Search
CPC .................................. F16C 3/03; B62D 1/192
See application file for complete search history.

(56) References Cited

U.S. PATENT DOCUMENTS 2,331,996 A * 10/1943 Maurer ................. B62D 1/185
74/493
3,434,368 A * 3/1969 Runkle ................. F16B 7/1463
74/493
(Continued)

FOREIGN PATENT DOCUMENTS

DE 4329735 A1 3/1995
EP 0156114 A1 10/1985
(Continued)

OTHER PUBLICATIONS

Patents Act 1977: Search Report under Section 17(5), Application No. GB1514614.5, dated Feb. 12, 2016.
(Continued)

*Primary Examiner* — Nicole T Verley
(74) *Attorney, Agent, or Firm* — MacMillian, Sobanski & Todd, LLC

(57) ABSTRACT

A collapsible steering column assembly comprises a telescopic steering shaft that is supported within a steering column shroud, comprising a first shaft having a hollow end, the inner surface of the hollow end being provided with a plurality of inwardly facing elongate splines that each extend axially along the inner surface, and a second shaft that has an end that is located within the hollow end of the first shaft, the second shaft being provided with a set of outwardly facing elongate splines that each extend axially along the outer surface of the end of the second shaft, the splines of the second shaft inter-engaging the splines of the first shaft to prevent relative rotational movement of the two shafts whilst permitting the two shafts to move axially relative to one another at least in the event of a crash. A contact device is located at the end of the second shaft that is located within the hollow end of the first shaft that includes a contact member defining a contact part that contacts the tips of a plurality of the splines of the first
(Continued)

portion, thereby to take up any radial free play between the end of the second portion and the first portion at least in the location of the contact device.

9 Claims, 3 Drawing Sheets

(51) Int. Cl.
*F16C 3/03* (2006.01)
*B62D 1/18* (2006.01)

(56) References Cited

U.S. PATENT DOCUMENTS

| | | | | |
|---|---|---|---|---|
| 3,461,740 A * | 8/1969 | Moriya | ................. | B62D 1/192 |
| | | | | 74/492 |
| 3,851,542 A * | 12/1974 | Adams | ..................... | B62D 1/18 |
| | | | | 74/492 |
| 4,317,387 A * | 3/1982 | Myers | ................... | B62D 1/184 |
| | | | | 403/108 |
| 4,572,023 A * | 2/1986 | Euler | ..................... | B62D 1/184 |
| | | | | 280/775 |
| 4,867,003 A * | 9/1989 | Beauch | ................. | B62D 1/192 |
| | | | | 74/492 |
| 5,226,853 A * | 7/1993 | Courgeon | .............. | B62D 1/185 |
| | | | | 277/500 |
| 5,590,565 A * | 1/1997 | Palfenier | ................ | B62D 1/181 |
| | | | | 74/493 |
| 5,640,884 A * | 6/1997 | Fujiu | ................. | B29C 45/14491 |
| | | | | 280/777 |
| 5,672,111 A | 9/1997 | Schremmer et al. | | |
| 5,813,794 A * | 9/1998 | Castellon | ............... | B62D 1/192 |
| | | | | 403/359.5 |
| 6,026,704 A * | 2/2000 | Shibata | ............ | B29C 45/14491 |
| | | | | 280/777 |
| 6,076,425 A * | 6/2000 | Worrell | .................... | B62D 1/10 |
| | | | | 403/379.4 |
| 6,116,837 A * | 9/2000 | Suhle | ...................... | F16B 9/023 |
| | | | | 411/353 |
| 6,935,657 B2 * | 8/2005 | Kondou | ................. | B62D 1/192 |
| | | | | 280/777 |
| 8,714,047 B2 * | 5/2014 | Yamamoto | ............. | B62D 1/184 |
| | | | | 280/779 |
| 9,296,410 B2 * | 3/2016 | Isogai | ....................... | B62D 1/18 |
| 9,738,306 B2 * | 8/2017 | Barbat | .................... | B60R 21/00 |
| 9,919,727 B2 * | 3/2018 | Jager | ........................ | B62D 1/16 |
| 2012/0325041 A1 * | 12/2012 | Sakuma | ................... | B62D 1/16 |
| | | | | 74/493 |
| 2015/0225010 A1 * | 8/2015 | Chiba | .................... | B62D 1/192 |
| | | | | 74/493 |

FOREIGN PATENT DOCUMENTS

| | | | | |
|---|---|---|---|---|
| EP | 0612650 A1 * | 8/1994 | ............. | B62D 1/192 |
| EP | 0755843 A1 * | 1/1997 | ............. | B62D 1/185 |
| EP | 1500832 A1 | 1/2005 | | |
| FR | 2781749 A1 * | 2/2000 | ............. | B62D 1/185 |
| GB | 1150868 | 5/1969 | | |
| GB | 2316150 A | 2/1998 | | |
| JP | H11198822 A | 7/1990 | | |
| JP | 2011178251 A * | 9/2011 | | |
| JP | 2012087836 A | 5/2012 | | |
| JP | 5429379 B2 * | 2/2014 | | |
| KR | 20030033840 A | 5/2003 | | |
| WO | WO-2008003794 A1 * | 1/2008 | ............. | B62D 1/185 |
| WO | WO-2018024881 A1 * | 2/2018 | ............. | B62D 1/192 |

OTHER PUBLICATIONS

PCT International Search Report and the Written Opinion, Application No. PCT/EP2016/067471 filed Jul. 21, 2016, dated Oct. 28, 2016.

Chinese First Office Action, Application No. 201680052266.8, dated Aug. 12, 2019.

* cited by examiner

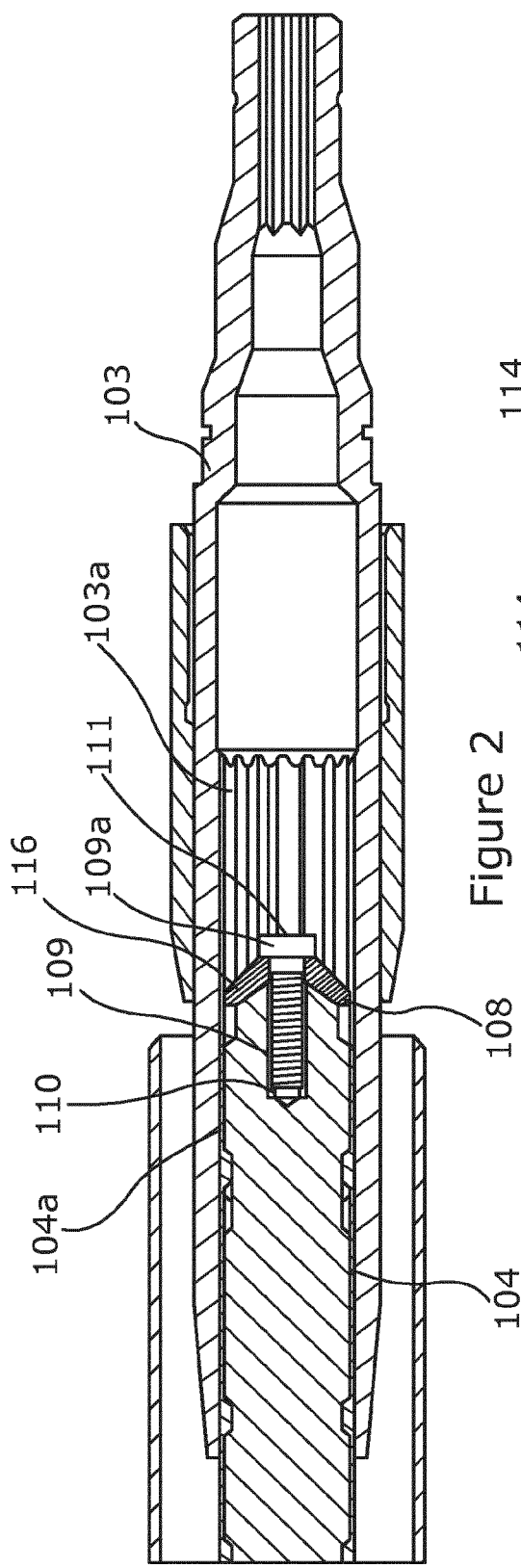
Figure 2
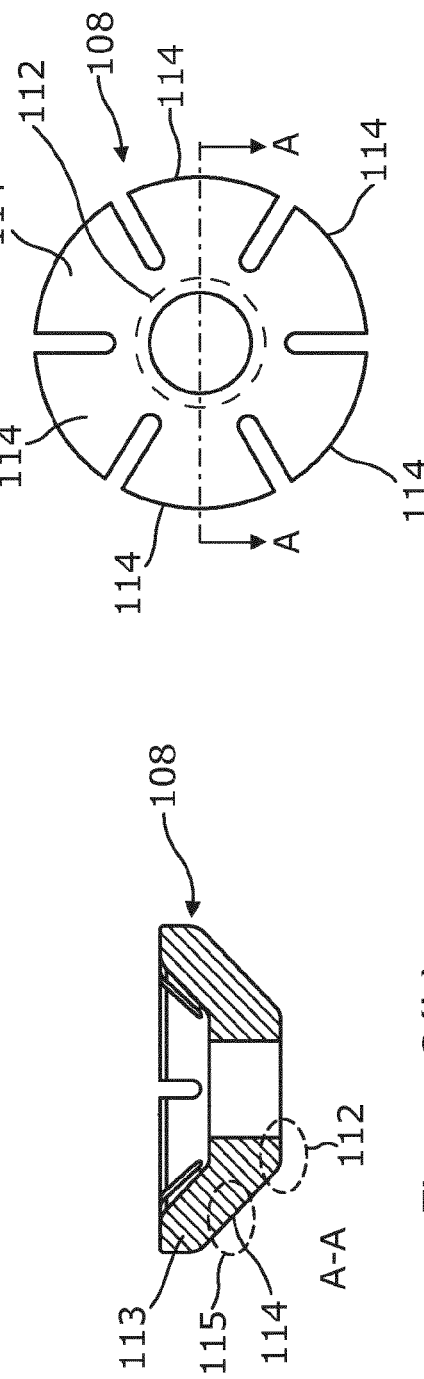
Figure 3(a)
Figure 3(b)

STEERING COLUMN ASSEMBLY

CROSS-REFERENCE TO RELATED APPLICATIONS

This application is a national stage of International Application No. PCT/EP2016/067471, filed 21 Jul. 2016, the disclosures of which are incorporated herein by reference in entirety, and which claimed priority to Great Britain Patent Application No. 1514614.5, filed 17 Aug. 2015, the disclosures of which are incorporated herein by reference in entirety, and European Patent Application No. 15461549.6, filed 27 Jul. 2015, the disclosures of which are incorporated herein by reference in entirety.

BACKGROUND OF THE INVENTION

This invention relates to improvements in steering column assemblies.

It is known to provide a collapsible steering column assembly comprising a steering shaft that is supported within a steering column shroud. To prevent significant injury to the driver in the event of a crash the steering column should be able to collapse as an axial load is applied through the steering wheel, for instance in a front impact where an unrestrained driver is thrown onto the steering wheel.

The steering column shaft may collapse through the use of a weakened section of shaft. However, in a typical modern vehicle the steering shaft is able to collapse telescopically with a first part of the shaft sliding over a second part of the shaft. Advantageously, this same telescopic motion may be used to provide for a range of adjustment of the steering column assembly for reach. In that case, the shaft is typically supported within a shroud that is also telescopic and comprises two portions: an upper shroud portion and a lower shroud portion. A locking mechanism fixes the steering shaft at a desired length, and this is arranged typically so that it is overcome in a crash to permit the desired collapse in length.

To allow a torque to be carried across the two parts of the steering shaft, the end portion of one part of the shaft—typically the upper shaft that is nearest the steering wheel—is hollowed and provided with inwardly extending elongate splines around the circumference of the inner surface. These engage corresponding outwardly facing splines on an end of the other part of the shaft. The splines prevent relative rotation of the two parts of the shaft about their common axis whilst allowing the shafts to slide telescopically. A low friction coating may be provided on the splines in the form of an overmolding, which also has the benefit of allowing the dimensions of the splines to be closely controlled. This is important to prevent the two parts of the shaft tilting relative to one another.

The present invention aims to at least partially ameliorate problems associated with free play present between the two parts of the telescopic steering shaft in such a steering column assembly.

BRIEF SUMMARY OF THE INVENTION

According to a first aspect the invention provides a collapsible steering column assembly comprising a telescopic steering shaft that is supported within a steering column shroud, the telescopic steering shaft comprising:

A first shaft having a hollow end, the inner surface of the hollow end being provided with a plurality of inwardly facing elongate splines that each extend axially along the inner surface, a second shaft that has an end that is located within the hollow end of the first shaft, the second shaft being provided with a set of outwardly facing elongate splines that each extend axially along the outer surface of the end of the second shaft, the splines of the second shaft inter-engaging the splines of the first shaft to prevent relative rotational movement of the two shafts whilst permitting the two shafts to move axially relative to one another at least in the event of a crash, characterized by further comprising a contact device located at the end of the second shaft that is located within the hollow end of the first shaft that includes a contact member defining a contact part that contacts the tips of a plurality of the splines of the first portion, thereby to take up any radial free play between the end of the second portion and the first portion at least in the location of the contact device.

The applicant has appreciated that there may be some free radial play between the two shafts because of the need to allow for some dimensional tolerances in the manufacture of the shafts. In particular to ensure the splines do not bind when they are sliding axially it is important to control the tolerances but this is difficult to achieve precisely. The provision of the contact device takes up any free radial play between the first and second shaft portions and in doing so may help reduce the risk of the column shaft vibrating during use by altering the natural frequency of the shaft and additionally improving the stiffness of the shaft. This may also help prevent a rattle noise being produced from the steering shaft.

The contact device may comprise a resilient member that is secured to the second shaft and is placed under a static force, the magnitude of the force setting the outer dimension of the member. Where the outer edge of the member forms part of a circle, the force may set the diameter of that circle.

The static force may compress any combination of compression, tension or bending or twisting force that causes the resilient member to deform into shape that differs from its nature rest shape when no load is applied. Most preferably the force is a compressive force.

The resilient member preferably comprises an element that is discrete from the end of the second shaft and is secured to the second shaft by a fastener, the fastener applying a force to the resilient member that controls the outer dimension of the element.

In an alternative, the resilient member could be an integral part of the second shaft part.

The contact member may comprise a generally truncated conical shape with an inner diameter and an outer diameter that is secured in a first region towards the inner diameter to the end of the second shaft portion by a fastener, the member being arranged such that the outer edge of the member define the contact portion that engages the tips of a plurality of the splines of the first shaft part. The first region may define a hub of the contact member.

The axis of rotation of the member may be coincident with the axis of rotation of the second shaft part.

The member may be secured to the second shaft part by the fastener such that a second region of the member that is radially offset from the hub of the member engages a profiled surface of the end portion of the second shaft, whilst the hub is axially offset from the end of the second shaft and engages the fastener.

The fastener may be adjustable to vary the force with which the first region of the member is pulled towards the end of the second shaft part, whereby as the hub is pulled closer towards the second shaft part the profiled surface presses on the second region of the member to cause the member to deform, thereby altering the outer radial diameter of the conical member.

The fastener may include a biasing means that acts between a fixed part of the fastener and the hub of the contact member. This may comprise a spring, such as a coil spring.

The contact member may be secured to the end of the second shaft such that the cone points away from the second shaft, the profiled surface of the end of the second shaft being convex whereby as the fastener draws the conical member onto the terminal end the cone splays and increases in outer diameter.

In an alternative, the truncated conical contact member may be secured so that the cone points towards the second shaft, the terminal end portion of the second shaft being convex, whereby the fastener pulls the conical member into the convex terminal end portion causing the outer diameter to be reduced.

Where the terminal portion is convex it may be defined by a simple chamfer provided around the end of the second shaft part.

The fastener may comprise a threaded bolt that passes through a hole in the member to engage a threaded hole in the second shaft. The head of the bolt may be provided with a profile suitable for engagement with a suitable tool that allows the bolt to be torqued up. The biasing means, where provided, may comprise a coil spring that is located concentrically around the stem of the bolt.

A single bolt may be provided that engages a threaded hole in the second shaft. The hole may extend axially along the second shaft and may be on the axis of rotation of the second shaft.

As an alternative to a bolt, a threaded stud may be secured to the end of the second shaft part that passes through a hole in the dished member and the dished member secured by a nut.

The thread of the bolt or nut or stud may be provided with a locking compound or adhesive to prevent movement once it has been set, typically during initial assembly.

The first shaft part may have a bore that extends along its full length to allow access to the adjustable fastener with the second shaft engaged with the first shaft.

In use, the second shaft part is pushed into the first shaft part and the adjustable fastener adjusted until the member has taken up any unwanted free play. The friction may then be checked to ensure the anti-vibration device is not pressed too firmly onto the inwardly facing splines. This check could alternatively be performed by deliberately vibrating the shaft during adjustment of the fastener and noting from the change in resonant frequency when the member has just come into contact with the splines.

The skilled reader will appreciate that the generally truncated conical member may have many shapes that can all be considered to be generally conical. It may only be conical on one surface—the one that engages the second shaft part. The outer edge need not be continuous, but should extend over at least three regions that are spaced apart by approx. 120 degrees to allow the anti-vibration device to self centre the second shaft part within the hollow end of the first shaft part.

In one preferred arrangement the contact member may comprise a hub portion and a plurality of radially extending fingers or petals that project away from the hub portion and form the generally conical shape, the hub defining the radial inner portion whereby the fastener pulls on the member and the fingers or petals each defining an arcuate outer contact outer portion at the extreme tips of the fingers or petals that engages the splines of the first shaft portion.

It is preferred that the arcuate edges cover as much of a circular path as possible, to contact the maximum number of spline tips.

The terminal portion of the second shaft may press upon each finger or petal in a region approximately midway between the hub and the terminal edge of the petals, each petal acting as an individual leaf spring.

The contact member should be resilient so that as the fastener is loosened the member will move back towards its unstressed shape. It may for instance comprise a metal member such as a spring steel member. But it could be made from a plastically deformable material, accepting that during installation the member can be splayed as more tension is applied but on releasing tension it will not spring back to the original shape. This makes assembly harder but still possible with care.

There may be at least 5, or at least 6, petals, each having a radial outer surface defining the contact part that follows an arc that lies on a circle centered on the axis of the member and axis of the telescopic shaft.

Providing petals allows each one to independently adjust as the fastener is adjusted, to give the optimum take up of radial play between the two shaft parts without introducing excess friction.

The member, or at least the portion that engages the splines of the hollow end of the first shaft, may be of a low friction material such as a plastic material. For example, a polietylen material may be used. As well as optimally being a low friction material the material should preferably be hard wearing so that it is not worn away during adjustment of the length of the steering column shaft.

The first shaft portion may comprise an upper portion of the steering column assembly and may be located closer to the steering wheel than the second shaft portion. The end of the first shaft portion may be provided with a plurality of external splines for engaging splines of a steering wheel hub.

The lower shroud portion may comprise an input shaft for a torque sensor.

The torque sensor may additionally comprise an output shaft connected to the input shaft by a torsion bar. The output shaft may form an input to a gearbox assembly.

The shroud may also be telescopic and may comprise an upper shroud portion and a lower shroud portion, the two being able to move telescopically to vary the length of the shroud.

The upper shroud portion may be located towards the end of the steering shaft that is nearest the steering wheel and the lower portion may be located towards the end of the shaft furthest from the steering wheel, the upper portion being at least partially received within the lower portion so that the upper portion can telescopically collapse into the lower portion during a crash.

The shroud may be secured to the vehicle by a support bracket that includes two support bracket arms that depend from a base portion to embrace the shroud, a clamp rail that is releasably secured to the upper shroud portion, the clamp rail including a slot that extends generally horizontally, a clamp pin that extends through an opening in each of the arms of the bracket and through the generally horizontal slot in the rail, the clamp pin carrying a clamp mechanism that is movable between an unclamped position in which the rail can move freely relative to the clamp pin and a clamped position in which the rail is fixed relative to the clamp pin.

The steering column assembly may be of fixed length, telescopically collapsing only in the event of a crash, or may be adjustable for reach, or adjustable for rake, or adjustable for both reach and rake.

The invention may, in a second aspect comprise a method of assembly of a steering column assembly according to the first aspect comprising the step of adjusting the force applied to the contact member to remove any radial free play between the contact member and the first shaft.

The method may comprise setting the force to precisely set the outer diameter of the contact member to that required to remove any radial play, or to a diameter slightly larger than this yet ensuring that there is not an excessive friction force between the contact member and first shaft.

The step of adjusting may be performed after the end of the second shaft is inserted into the hollow end of the first shaft.

The step of adjusting may comprise tightening or loosening a bolt that comprises part of the contact device.

Other advantages of this invention will become apparent to those skilled in the art from the following detailed description of the preferred embodiments, when read in light of the accompanying drawings.

BRIEF DESCRIPTION OF THE DRAWINGS

FIG. 2 is an enlarged view of the region of the assembly of FIG. 1 where the two shafts forming the telescopic steering shaft are engaged;

FIG. 3 is view (a) in plan and (b) in cross section along the line A-A of the member of the contact device of the assembly of FIG. 1.

DETAILED DESCRIPTION OF THE INVENTION

Figure 1:
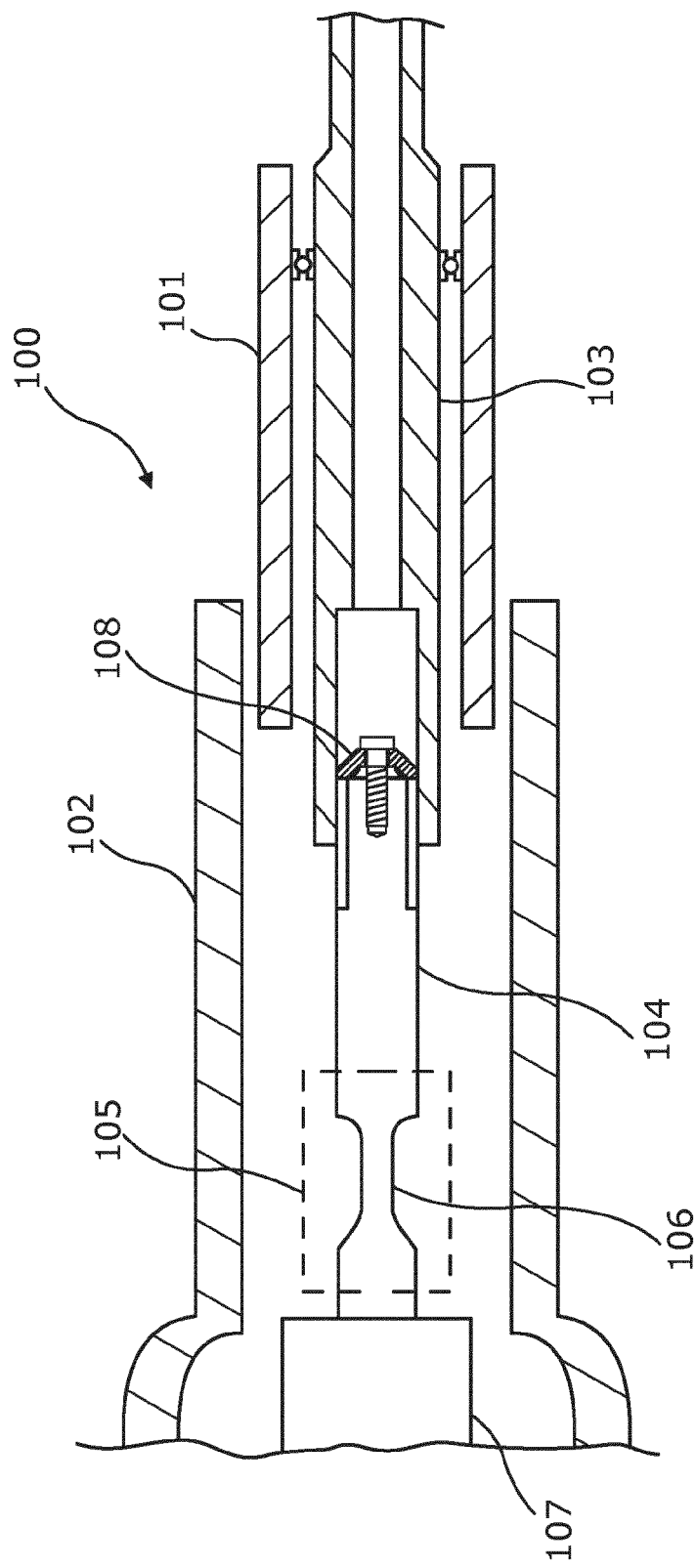
FIG. 1 is a cross section of an exemplary steering column assembly according to the present invention.

As shown in FIG. 1, a collapsible steering column assembly 100 comprises a two part telescopic steering shaft that is supported within a steering column shroud. The shroud has an upper part 101, that is located closest to a steering wheel (not shown) and a lower part 102 that is located furthest from the steering wheel and secured in the example to a housing of a gearbox for a gearbox 107. The shroud supports the steering shaft which comprises a first (upper) shaft 103 that is closest to the steering wheel and terminates with a splined coupling for receiving a hub of the steering wheel. The end of the first shaft 103 that is furthest from the steering wheel is hollowed out, and the inner surface of the hollow end is provided with a plurality of inwardly facing elongate splines 103a that each extend axially along the inner surface. Each spline has the same height from root to tip, the tips all lying on a circular path that is centered on the axis of the first shaft 103.

The steering shaft also comprises a second shaft 104 that has an end that is located within the hollow end of the first shaft 103, the end of the second shaft being provided with a set of outwardly facing elongate splines 104a that each extend axially along the outer surface of the end of the second shaft. The splines 104a of the second shaft complement and interengage with the splines 103a of the first shaft to prevent relative rotational movement of the two shaft portions whilst permitting the two shaft portions to move axially relative to one another at least in the event of a crash or during adjustment for reach.

Secured to the end of the second shaft 104, within the hollow end of the first shaft part, is a contact device. The contact device, which may function as an anti-vibration device to reduce vibration induced rattle of the two parts of the steering shaft, occupies a space between the second shaft and the inside of the hollow portion of the first shaft 103, making contact with the tips of the splines 103a of the first shaft part and helping to prevent excess vibration of the steering shaft by modifying the resonant frequency of the two part shaft. To do this, the spacer device must ensure there is no gap between the contact device and the inwardly facing splines, and ideally the contact device applies a very light pressure onto a plurality of the splines around the circumference of the hollow end portion with zero free play so that no radial movement of the second shaft relative to the first shaft is possible in the region where the spacer device is located.

The contact device in the example shown in the drawings can be seen most clearly in FIG. 2. The device comprises a resiliently deformable member 108 having a radially outermost edge 113 that lies at a constant radius from the axis of the second shaft so that all parts of the outer edge lie on the desired circular path. The contact member 108 is secured to the end of the second shaft by a bolt 109. This is shown more clearly in FIG. 2 of the drawings. The contact device has a generally truncated conical shape with an inner diameter and an outer diameter. More specifically, the member comprises a hub portion 112 and a plurality of radially extending fingers or petals 114 that project away from the hub portion and form the generally conical shape. Six petals are shown, the outer edge of each petal lying on the circular path and forming a set of six arcs, each spanning about 50 degrees of the circular path. The regions between the petals are cut away right back to the hub of the resilient member. The petals 114 define the cone shape.

The resilient contact member 108 is fixed onto the end of the second shaft part by the fastener. This comprises a bolt with a threaded stem 109 and a head 109a. The stem passes through a hole in the hub of the member that is smaller than the head 109a of the bolt (the bolt being on the opposite side of the member to the second shaft) and the stem is engaged into a complimentary thread of a threaded hole in the second shaft. The head 109a of the bolt is provided with a profile suitable for engagement with a suitable tool that allows the bolt to be torqued up.

The bolt holds the contact member such that the hub 112 of the member is slightly stood off from the end of the second portion and the head of the fastener pulls the inner portion towards the second shaft 104. The threaded stem of the bolt is therefore placed under tension as the petals of the member 108 are forced into contact with the second shaft part. Each petals 114 acts as a leaf spring and is deformed by this contact, causing the outer edge of the petals 114 to splay outwards. The amount of tension in the stem 109 of the bolt determines how much the resilient member is splayed and this sets the diameter of the circular path on which the outer edge of the petals lies. The region of the second shaft 104 that contacts the petals 114 in this example is chamfered, ensuring the petals 114 can slide smoothly over the end of the second shaft as the screw is tightened. The chamfer 116 in effect defines a cone shape that complements the cone shape of the contact member, the cone formed by the second shaft being forced into the cone of the contact member by the bolt.

In use the bolt is tightened or loosened to deform the petals 114 until a condition is reached in which the diameter of the arcs defined by the outer edge of the contact member is perfectly in contact with no free play with the inner tips of the splines 103a of the first shaft. This helps to lower the resonant frequency of the overall shaft compared with an arrangement without the anti-vibration device, especially where there is only a short overlap of the splines. The screw can be set once during assembly and testing and then left during the life of the steering column assembly. An adhesive applied to the threads of the shaft ensures that the screw cannot work loose over time.

Figure 4:
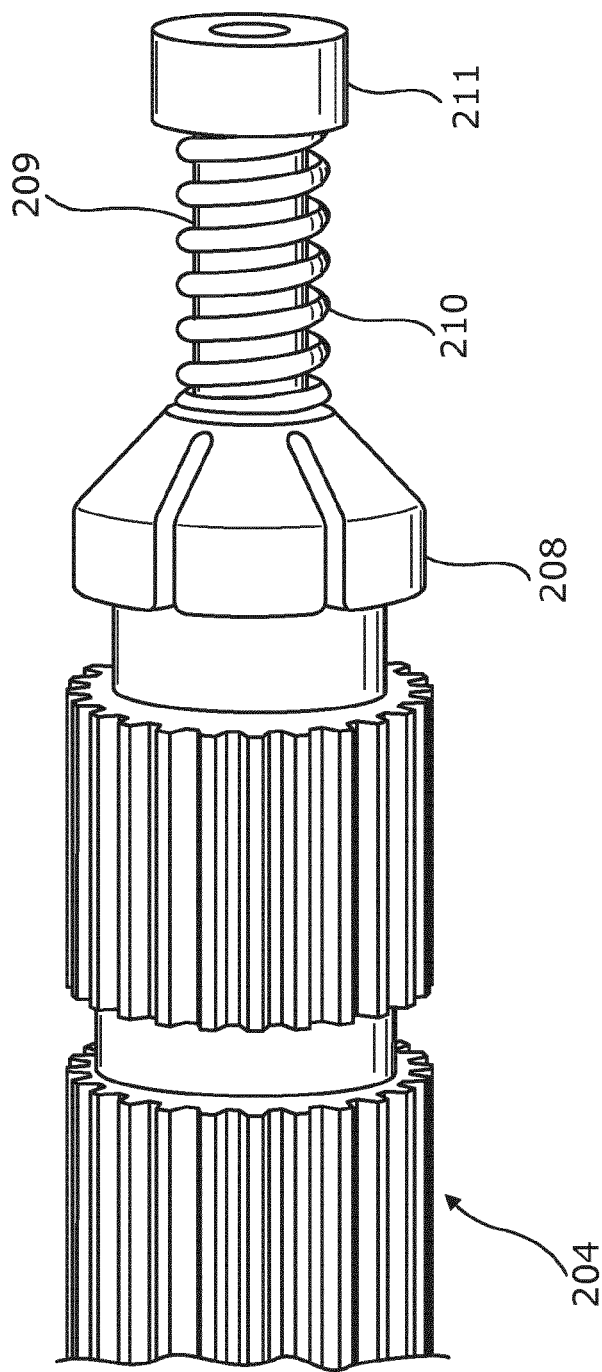
FIG. 4 is a view of a part of a second embodiment of a steering column assembly showing the location of an alternative contact device on the end of the second shaft.

In an alternative arrangement of contact device, which is shown in FIG. 4, a biasing means 220 in the form of a coil spring, may be located on the threaded stem 209 of a fastener bolt that acts between the head 211 of the bolt and the hub of the contact member 208. The spring is set so that it is compressed. The spring applies a compressive force onto the contact member, pushing it firmly onto the chamfered end of the shaft part 204, so that the force is dependent on the set position of the bolt and also the amount of compression of the coil spring 220. The contact member 208 is the same in this embodiment as the one shown for the first embodiment, and the bolt may also be the same albeit that the head is set further from the end of the second shaft 204. Of course, to accommodate the spring a longer bolt may be required compared with that use in the first embodiment.

This alternative arrangement ensure that even if the outer edge of the contact member 208 becomes worn during operation, the spring will compensate this effect by always ensuring the contact member is pressed onto the tips of the teeth in the hollow end of the first shaft. The spring will continue to take up wear until either: (a) the hub of the contact member hits the end of the second shaft, (b) the spring becomes uncompressed or (c) the remaining compressive force in the spring is insufficient to apply the required bending force to the petals of the contact member.

When such a spring 220 is present there is no need to tighten the bolt after column assembly. It can be set on exactly specified distance which ensures correct spring tension before column will be assembled and in the next step on the assembly line column can be assembly. The contact member petals will deform a little bit along with the coil spring to allow the contact member to deform and fit perfectly into the hollow end of the first steering shaft.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A collapsible steering column assembly comprising a telescopic steering shaft that is supported within a steering column shroud, the telescopic steering shaft comprising:
    a first shaft having a hollow end, an inner surface of the hollow end being provided with a plurality of inwardly facing elongate splines that each extend axially along the inner surface,
    a second shaft that has an end that is located within the hollow end of the first shaft, the second shaft being provided with a set of outwardly facing elongate splines that each extend axially along an outer surface of the end of the second shaft, the splines of the second shaft inter-engaging the splines of the first shaft to prevent relative rotational movement of the two shafts whilst permitting the two shafts to move axially relative to one another at least in the event of a crash, and
    further comprising a contact device located at the end of the second shaft that is located within the hollow end of the first shaft that includes a resilient contact member that contacts tips of a plurality of the splines of the first shaft, thereby to take up any radial free play between the end of the second shaft and the first shaft at least in the location of the contact device,
    wherein the resilient contact member is secured to the second shaft and is placed under a static force, a magnitude of the static force setting an outer dimension of the resilient contact member.

2. The collapsible steering column assembly according to claim 1 in which the resilient contact member comprises an element that is discrete from the end of the second shaft and is secured to the second shaft by a fastener, the fastener applying a force to the resilient contact member that controls the outer dimension of the element.

3. The collapsible steering column assembly according to claim 2 in which the fastener includes a biasing means that acts between a fixed part of the fastener and the hub of the resilient contact member.

4. The collapsible steering column assembly according to claim 3 in which the biasing means comprises a coil spring.

5. The collapsible steering column assembly according to claim 2 in which the resilient contact member comprises a hub portion and a plurality of radially extending fingers or petals that project away from the hub portion and form the generally conical shape, the hub defining a radial inner portion whereby the fastener pulls on the resilient contact member and the fingers or petals each defining an arcuate outer contact outer portion at the extreme tips of the fingers or petals that engages the splines of the first shaft portion.

6. The collapsible steering column assembly according to claim 1 in which the resilient contact member comprises a generally truncated conical shape with an inner diameter and an outer diameter that is secured in a first region towards the inner diameter to the end of the second shaft by a fastener, the resilient contact member being arranged such that an outer edge of the resilient contact member defines the contact part that engages the tips of the plurality of the splines of the first shaft and the first region defines a hub of the resilient contact member.

7. The collapsible steering column assembly according to claim 6 in which the resilient contact member is secured to the second shaft by the fastener such that a second region of the resilient contact member that is radially offset from the hub of the resilient contact member engages a profiled surface of the end of the second shaft, whilst the hub is axially offset from the end of the second shaft and engages the fastener.

8. The collapsible steering column assembly according to claim 7 in which the fastener is adjustable to vary a force with which the first region of the resilient contact member is pulled towards the end of the second shaft, whereby as the hub is pulled closer towards the second shaft the profiled surface presses on the second region of the resilient contact member to cause the resilient contact member to deform, thereby altering an outer radial diameter of the conical shape of the resilient contact member.

9. The collapsible steering column assembly according to claim 1 in which the resilient contact member, or at least the portion that engages the splines of the hollow end of the first shaft, is of a low friction material.

* * * * *